United States Patent
Malet

(10) Patent No.: US 7,968,655 B2
(45) Date of Patent: Jun. 28, 2011

(54) POLYAMIDE, POLYESTER AND POLYETHER BLOCK COPOLYMER

(75) Inventor: Frederic Malet, Rouen (FR)

(73) Assignee: Arkema France, Colombes (FR)

(*) Notice: Subject to any disclaimer, the term of this patent is extended or adjusted under 35 U.S.C. 154(b) by 80 days.

(21) Appl. No.: 12/301,772

(22) PCT Filed: Dec. 5, 2007

(86) PCT No.: PCT/FR2007/052444
§ 371 (c)(1),
(2), (4) Date: Nov. 21, 2008

(87) PCT Pub. No.: WO2008/071894
PCT Pub. Date: Jun. 19, 2008

(65) Prior Publication Data
US 2010/0234539 A1    Sep. 16, 2010

(30) Foreign Application Priority Data

Dec. 8, 2006 (FR) .................................. 06 55385
Aug. 28, 2007 (FR) .................................. 07 57223

(51) Int. Cl.
*C08G 69/48* (2006.01)
*C08G 65/32* (2006.01)

(52) U.S. Cl. ........ 525/425; 525/403; 525/434; 528/288; 528/318

(58) Field of Classification Search .................. 525/403, 525/425, 434; 528/288, 318
See application file for complete search history.

(56) References Cited

U.S. PATENT DOCUMENTS

| | | | |
|---|---|---|---|
| 5,253,871 A | 10/1993 | Viollaz | |
| 5,703,177 A | 12/1997 | Hoff | |
| 5,932,686 A * | 8/1999 | Hoff | ................. 528/288 |
| 2004/0158027 A1 | 8/2004 | Van Schijndel et al. | |

* cited by examiner

*Primary Examiner* — Ana L Woodward
(74) *Attorney, Agent, or Firm* — Thomas F. Roland

(57) ABSTRACT

The invention relates to a segmented block copolymer including polyamide blocks, polyester blocks and polyether blocks, of general formula: (I) -[BD-BM]$_n$- in which: BD or hard block is a polyamide block; BM or soft block represents a mixture of polyether blocks and polyester blocks; and n is the number of -BD-BM- units in said copolymer, characterized in that the percentage of polyether blocks (PE blocks) is strictly higher than 15 wt % of said copolymer, and in that said polyester blocks (PES blocks) have a glass transition temperature $T_g$ below 10° C.

24 Claims, 1 Drawing Sheet

POLYAMIDE, POLYESTER AND POLYETHER BLOCK COPOLYMER

Figure 1:
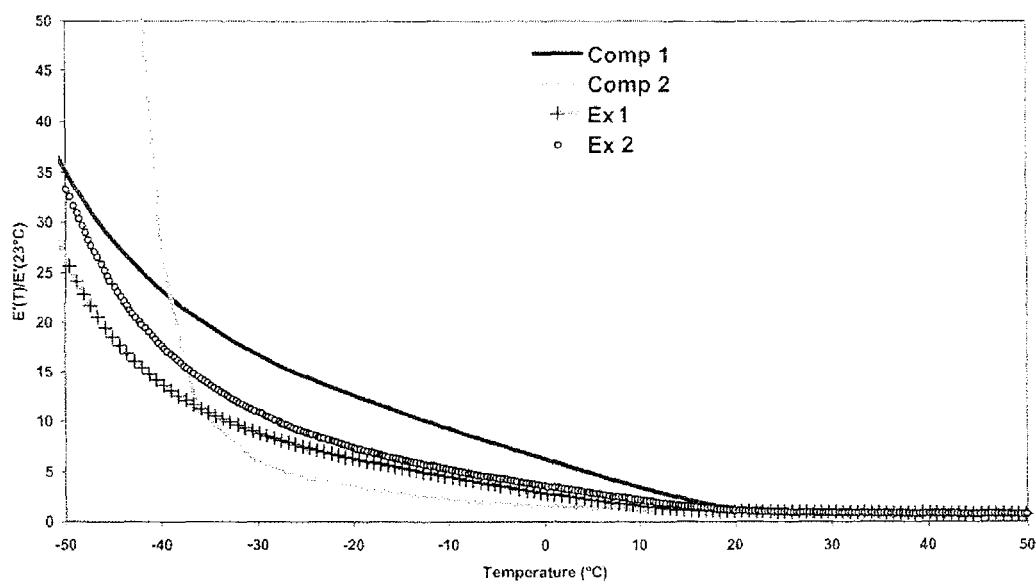

This application claims benefit, under U.S.C. §119 or §365 of French Application Number FR 0655385, filed Dec. 8, 2006; FR 0757223, filed Aug. 28, 2007; and PCT/FR2007/052444 filed Dec. 5, 2007.

FIELD OF THE INVENTION

The present invention relates to a novel copolymer comprising polyamide blocks, polyether blocks and polyester blocks.

BACKGROUND OF THE INVENTION

The polyamide blocks are known to be segments that are said to be "hard" at a melting temperature ($T_m$) or a glass transition temperature ($T_g$) that is higher than the usage temperature of the polymer whereas the polyether or polyester blocks are segments to that are said to be "soft" having a $T_m$ or $T_g$ lower than the usage temperature of said polymer.

Document US 2004/0158027 refers to a copolyesteramide having a glass transition temperature of 0° C. or below comprising (i) at least one hard segment comprising at least one amide function and (ii) at least one soft segment comprising at least one ester function, formed from at least one fatty acid dimer and/or one fatty diol dimer. The copolymer comprises less than 15%, preferably less than 10%, advantageously less than 5% and more particularly less than 2% of ether or ether groups. According to a preferred embodiment, the copolymer does not comprise any ether groups and consists exclusively of a copolymer with hard polyamide blocks and soft polyester blocks. This copolymer is particularly useful as a hot-melt adhesive.

Document U.S. Pat. No. 5,703,177 relates to a block copolyester/polyamide comprising at least one polyester (PES) block or one copolyester (coPES) block and a polyamide or copolyamide (coPA) block enabling moulded articles to be manufactured that are biologically biodegradable and compostable, which can be used in the field of packaging, hygiene products and medical products.

Document U.S. Pat. No. 5,253,871 relates to polyetheresteramides obtained and described in FR 2,273,021. These products are copolymers formed from polyamide blocks and polyether blocks, the polyamide blocks and the polyether blocks being linked by an ester function. These products are sold under the trade name PEBAX® by Arkema. That document does not describe copolymers comprising polyester blocks.

The copolymers with polyamide blocks (abbreviated below as PA), polyether blocks (abbreviated below as PE) and polyester blocks (abbreviated below as PES) result from the copolycondensation of polyamide blocks having reactive end groups with polyether blocks and polyester blocks having reactive end groups. For example, it is possible to react:
- a polyether diol, a polyester diol and a polyamide dicarboxylic acid;
- a polyetherdiamine, a polyester diol and a polyamide dicarboxylic acid;
- a polyetherdiamine, a polyesterdiamine and a polyamide dicarboxylic acid;
- a polyether diol, a polyesterdiamine and a polyamide dicarboxylic acid;
- a polyether dicarboxylic acid, a polyesterdiamine and a polyamidediamine;
- a polyether dicarboxylic acid, a polyester diol and a polyamidediamine;
- a polyether diol, a polyester dicarboxylic acid and a polyamidediamine; and
- a polyetherdiamine, a polyester dicarboxylic acid and a polyamidediamine.

The polyamide blocks having dicarboxylic chain ends derive, for example, from the condensation of polyamide precursors in the presence of a dicarboxylic acid chain stopper.

The polyamide blocks having diamine chain ends derive, for example, from the condensation of polyamide precursors in the presence of a diamine chain stopper.

The polymers having PA blocks, PE blocks and PES blocks may also comprise randomly distributed units. Said polymers may be prepared by the simultaneous reaction of the PE blocks, the PES blocks and the PA block precursors. Preferably, said polymers are prepared by the simultaneous reaction of the PE blocks and the PA block precursors then addition of the PES blocks in order to minimize the exchange reactions between PA blocks and PES blocks.

A polymer is obtained having mainly PE blocks, PES blocks and PA blocks of very variable length, depending on the time at which the chain stopper intervenes during the formation of the PA block, but also the various reactants which have reacted randomly and are distributed randomly along the polymer chain.

Advantageously, there are two possible types of PA blocks in the copolymers according to the invention. The polyamide block may be made up either of a "homopolyamide" structure derived from the polymerization of a single monomer namely a single lactam, a single amino acid or a single (dicarboxylic acid/diamine) pair or from a "copolyamide" type structure derived from the polymerization of a mixture of at least two monomers taken from the three aforementioned types.

The polyamide blocks are obtained in the presence of a dicarboxylic acid or a diamine chain stopper, depending on whether polyamide blocks having respectively carboxylic acid or amine ends are desired. If the precursors already comprise a dicarboxylic acid or a diamine, it is sufficient for example to use it in excess, but it is also possible to use another dicarboxylic acid or another diamine taken from the groups of dicarboxylic acids and diamines defined below.

The applicant company has now discovered that the presence of a certain quantity of PES blocks in the soft segment(s) of a copolymer having polyamide blocks and polyether blocks (abbreviated as PEBA) allows advantageous properties to be obtained in terms of low-temperature stiffening of the flexible grades, density, hydrolysis resistance (lower water uptake) and ageing (thermal oxidation and UV) resistance.

SUMMARY OF THE INVENTION

One subject of the present invention is therefore a copolymer comprising polyamide blocks, polyester blocks and polyether blocks of general formula:

-[HB-SB]$_n$-  (I)

and in which:
HB or Hard Block represents a polyamide block or a blend of polyamide blocks (PA blocks);
SB or Soft Block represents a blend of polyether blocks (PE blocks) and polyester blocks (PES blocks);
n represents the number of -HB-SB- units of said copolymer;

the weight percentage of the polyether blocks in the copolymer is strictly greater than 15%, preferably >20%, advantageously >30%, even more advantageously >40%;

said polyester blocks have a glass transition temperature $T_g$ below 10° C., preferably <0° C., advantageously <−10° C., even more advantageously <−20° C., ideally <−30° C.; and the weight percentage of PA blocks is strictly less than 85%, preferably <70%, advantageously <50%, even more advantageously <30%.

n ranges from 1, in particular being at least 5, more preferably at least 6, and ranging up to an average of 60, preferably up to an average of 30, more preferably up to an average of 25.

According to one embodiment, the copolymer is characterized in that the number-average molecular weight of the polyamide blocks is between 500 and 10 000 g/mol, preferably between 600 and 6000 g/mol.

According to one embodiment, the copolymer is characterized in that the number-average molecular weight of the polyether blocks is between 100 and 5000 g/mol, preferably between 200 and 3000 g/mol.

According to one embodiment, the copolymer is characterized in that the number-average molecular weight of the polyester blocks is between 800 and 5000 g/mol, preferably between 1000 and 3500 g/mol.

DETAILED DESCRIPTION OF THE INVENTION

According to one embodiment, the copolymer is characterized in that its number-average molecular weight is >6000 g/mol, preferably >10 000 g/mol, even more advantageously >15 000 g/mol.

The PA blocks may have carboxylic acid end groups, and are then referred to as PA dicarboxylic acid, or else they may have amine end groups, and be referred to as PA diamine. The bonds between the PA blocks and the soft blocks (SB) may therefore be ester bonds or else amide bonds.

The polyamide blocks may be made up of:

(i) a homopolyamide structure derived from the polymerization of (a) a lactam, in particular a $C_4$-$C_{12}$ lactam (b) an amino acid, in particular a $C_4$-$C_{12}$ amino acid, (c) a (dicarboxylic acid/diamine) pair that is a condensation product of an aliphatic or aromatic dicarboxylic acid, preferably a $C_2$-$C_{40}$, preferably a $C_6$-$C_{36}$ and even more preferentially a $C_6$-$C_{18}$, linear or branched, aliphatic dicarboxylic acid and a $C_2$-$C_{40}$, linear or branched, aliphatic diamine, or else a $C_2$-$C_{40}$ aromatic, semi-aromatic or non-aromatic cyclic diamine; or (ii) a copolyamide structure derived from the polymerization of a mixture of at least two from among (a), (b) and (c).

As examples of lactams, mention may be made of caprolactam, oenantholactam and lauryl lactam.

As examples of amino acids, mention may be made of aminocaproic acid, 7-amino-heptanoic acid, 11-aminoundecanoic acid and 12-aminododecanoic acid.

As examples of dicarboxylic acids, mention may be made of (i) aliphatic acids such as 1,4-cyclohexyldicarboxylic acid, butanedioic, adipic, azelaic, suberic, sebacic, pimelic, 1,7-heptanedioic, 1,8-octanedioic, 1,9-nonanedioic, 1,10-decanedioic, 1,11-undecanedioic, 1,12-dodecanedicarboxylic, 1,14-tetradecanedicarboxylic and 1,18-octadecanedicarboxylic acids, (ii) aromatic dicarboxylic acids such as terephthalic and isophthalic acids, but also (iii) dimerized fatty acids.

The dicarboxylic acids may be $C_{10}$-$C_{30}$, even more preferentially $C_{12}$-$C_{24}$, advantageously $C_{14}$-$C_{22}$ fatty acid dimers and more especially fatty acid dimers having a $C_{18}$ alkyl chain. Suitable fatty acid dimers are the dimerization products of two fatty acids, whether identical or different, chosen from oleic, linoleic, linolenic, palmitoleic and elaidic acid. The dimerization products of a mixture of unsaturated fatty acids may be obtained by the hydrolysis of vegetable oils or fats, for example sunflower oil, soybean seed oil, olive oil, rapeseed oil or cottonseed oil. Fatty acid dimers hydrogenated for example, by using nickel catalysts, may also be used.

Regarding the diamine, it is chosen from:
linear or branched aliphatic diamines; and
aromatic, semi-aromatic or non-aromatic cyclic diamines.

As examples of diamines, mention may be made of 1,4-tetramethylenediamine, 1,6-hexamethylenediamine, 1,9-nonamethylenediamine, 1,12-dodecamethylenediamine, trimethylhexamethylenediamine, isomers of bis(3-methyl-4-aminocyclohexyl)methane (BMACM), para-aminodicyclohexylmethane (PACM), isomers of 2,2-bis(3-methyl-4-aminocyclohexyl)propane (BMACP), isomers of bis(4-aminocyclohexyl)methane (BACM), 2,2-bis(3-methyl-4-aminocyclohexyl)propane (BMACP), 2,6-bis(aminomethyl)norbornane (BAMN), para-aminodicyclohexylmethane (PACM), isophoronediamine (IPDA), m-xylenediamine (MXD) and piperazine (Pip).

In particular, the PA blocks may be chosen from the PA-6, PA-11 and PA-12 blocks and the PA-4,6, PA-4,12, PA-4,14, PA-4,18, PA-6,6, PA-6,10, PA-6,12, PA-6,14, PA-6,18, PA-Pip10, PA-9,6, PA-9,12, PA-10,10, PA-10,12, PA-10,14, PA-10,18, PA-6/11 and PA-11/12 blocks.

The PE blocks are polyalkylene ether polyols, especially polyalkylene ether diols. The PE blocks are chosen from polyethylene ether glycol (PEG), polypropylene ether glycol (PPG), polytetramethylene ether glycol (PTMG), polyhexamethylene ether glycol, polytrimethylene ether glycol (PO3G), poly(3-alkyltetrahydrofuran) in particular poly(3-methyltetrahydrofuran (poly(3MeTHF)) and block or random copolymers thereof. A "copolyether" type PE block may also be envisaged containing a chain of at least two of the abovementioned PE blocks.

The chain ends of the PE blocks may be diOH, diNH$_2$, diisocyanate or diacid according to their method of synthesis.

The PE blocks with NH$_2$ chain ends may be obtained by cyanoacetylation of α, ω-dihydroxylated aliphatic polyoxyalkylene blocks known as polyether diols, such as the products Jeffamines® D400, D2000, ED2003 and XTJ 542 from Huntsman.

The PES blocks are usually manufactured by polycondensation between a dicarboxylic acid and a diol. Suitable carboxylic acids comprise those mentioned above used for forming the polyamide blocks with the exception of terephthalic and isophthalic acids. Suitable diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol. The PES's based on fatty acid dimers, in particular products from the PRIPLAST® range from Uniqema are preferred.

The present invention also relates more particularly to the use of a copolymer of formula (I) as defined above, with the exception of its use as a hot-melt adhesive. The copolymer according to the invention may be used alone or as an additive. It may be used to manufacture, wholly or in part, shaped articles, such as fibres, fabrics, films, sheets, rods, tubes or injection-moulded parts.

The articles or components of articles manufactured with the copolymers according to the invention advantageously form part of the sports equipment field. These are components of sports shoes, sports accessories such as ice skates, ski bindings, rackets, sports bats, boards, horseshoes, fins, golf balls, recreational or do-it-yourself equipment, highway tools or equipment exposed to the weather and subject to mechanical abuse, protective articles such as visors for helmets or caps, glasses, side arms of glasses, vehicle components (in particular for scooters, mopeds, motorbikes, cars or bicycles) such as headlight protectors, rear view mirrors, small components of all-terrain vehicles, tanks or conveyor belts.

Some patents or patent applications including U.S. Pat. No. 4,858,924 and U.S. Pat. No. 4,919,434, in the field of golf balls, mention elastomeric polyamide materials used to manufacture the external or intermediate layers of a golf ball. However, our copolymer according to the invention is not described in these documents.

For a "golf ball" application for manufacturing both the core and the external coating of said ball and also the optional intermediate layers between said core and said external coating, it is possible to use the copolymer according to the invention wholly or in part.

In the case where the copolymer according to the invention is used in part, it is possible to use, as another component, at least one ionomer, which is chosen from the group of products of the following type: olefin (in particular, copolymers of an olefin and of an unsaturated carboxylic acid of $\alpha,\beta$-ethylenic type in which at least some of the carboxylic acid groups are neutralized by metal ions), polyester, copoly(ether-ester), copoly(ester-ester), polyamide, polyether, polyurethane, polyacrylate, polystyrene, SBS, SEBS and polycarbonate (homopolymer, copolymer and block copolymer) as described in U.S. Pat. No. 6,187,864. Mention may be made, as ionomers, of SURLIN® products (in particular the SURLIN® products of magnesium ionomer, lithium ionomer, sodium ionomer and zinc ionomer type) and NAFION® by DuPont de Nemours and the IOTEK® products by Exxon.

The advantage of the copolymer according to the invention is that it makes it possible to decrease the moisture uptake of the ball and to avoid the negative impact of such an uptake on its mechanical properties, which may be, amongst others, compressibility, ability to achieve a high take-off speed and ability to improve the coefficient of restitution.

The copolymer according to the invention may be used in compositions which may additionally comprise: dyes, whitening agents for UV absorbers, antioxidants, stabilizers, softening agents, plasticizers, impact modifiers, reinforcing agents, nucleating agents and mixtures thereof.

The invention will now be exemplified below, in which PRIPLAST® 1838 denotes a polyester diol sold by Uniqema.

Experimental Conditions:

Semicircular samples of Comp 1, Comp 2 and Ex 1 were cut out with the thickness indicated in Table 1 below. They were then dried to constant weight in an oven at 40° C. The measurement of water uptake at 23° C. was then carried out on said samples according to the principle detailed below.

Principle

The dried samples were immersed in a crystallizing dish (1 sample per crystallizing dish) filled with distilled water at a regulated temperature of 23° C. The samples had a surface area of 867 mm² (diameter=4.7 cm). The samples were regularly weighed after a quick drying of their surface. Therefore the increase in weight of the samples immersed in water was followed. Assuming that the Fickean model is applicable, the following equation, which is valid in the short term, allows the diffusion coefficient to be obtained from the slope of the curve $M_{(t)}/M_{(\infty)}=f(\sqrt{t})$:

$$\frac{M(t)}{M(\infty)} = 4\sqrt{\frac{Dt}{\pi e^2}}$$

where $M_{(t)}$ is the quantity of water absorbed at t;
$M_{(\infty)}$ is the quantity of water absorbed at equilibrium;
D is the diffusion coefficient; and
e is the sample thickness.

Low Temperature Stiffening

Stiffening is known as the ratio of the modulus $E'_{(T°\,C.)}/E'_{(23°\,C.)}$. FIG. 1 below allows the change in this ratio as a function of the temperature to be seen.

Preparation of the Nylon-12 Dicarboxylic Acid

Introduced into an autoclave reactor were, 1200 g of lactam-12 and 386.39 g of adipic acid with 7 wt % of water, before rendering it inert under nitrogen. The temperature was raised to 270° C. then it was held at this temperature for 2 h, the pressure achieved was then 23 bar. Next, the pressure was reduced to atmospheric pressure and the reaction was continued at this pressure and with nitrogen flushing for 30 minutes before removing the oligomer from the reactor. A potentiometric analysis of the chain ends showed that the molecular weight of the nylon-12 diacid was 630 g/mol.

Comp 1

Introduced into a glass reactor were 15 grams of the previously prepared nylon-12 diacid of molecular weight 630 g/mol and 50 g of PTMG 2000. The reactor was placed in an oil bath at 250° C. Once the mixture had completely melted, it was stirred at 125 rpm for 60 minutes. The reactor was then put under vacuum for around 10 minutes in order to achieve a vacuum of around 5 mbar. Next, 0.3 wt % of Zr(OBu)₄ catalyst was added via a solution in toluene. The stirring was increased to 250 rpm. The progress of the reaction was followed by the change in the motor torque. At the end of 6 minutes, the stirring was reduced to 50 rpm, then the reaction was stopped 2 minutes later.

Comp 2

The copolymer was produced under the same conditions as before but using 15 g of the previously obtained nylon-12 diacid and 50 grams of PRIPLAST 1838.

Ex 1

The copolymer was produced under the same conditions as for Comp 1 but using 15 g of nylon-12 diacid, 25 g of PTMG 2000 and 25 g of PRIPLAST 1838.

Ex 2

The copolymer was produced under the same conditions as for Comp 1 but using 12 g of nylon-12 diacid, 26 g of PTMG 2000 and 14 g of PRIPLAST 1838.

TABLE 1

| Test | HB Type | HB $M_n$ (g/mol) | SB Nature | SB $M_n$ (g/mol) | DSC 2nd heat (°C) | % water absorption at equilibrium at 25°C | Density |
|---|---|---|---|---|---|---|---|
| Comp 1 | PA-12 | 630 | PTMG | 2000 | $T_{m1}$ = 12.1<br>$T_{m2}$ = 136.9<br>$T_g$ = −73.2 | 1.3 (1944*) | 1.003 |
| Comp 2 | | | PRIPLAST® 1838 | | $T_{m1}$ = none<br>$T_{m2}$ = 124.3<br>$T_g$ = −53.1 | 0.52 (1934*) | — |
| Ex 1 | | | 50/50 PTMG 2000/<br>PRIPLAST® 1838 | | $T_{m1}$ = 3.2<br>$T_{m2}2$ = 128.0<br>$T_g$ = −70.3 | 0.6 (1954*) | 0.989 |
| Ex 2 | | | 65/35 PTMG 2000/<br>PRIPLAST® 1838 | | $T_{m1}$ = 8.3<br>$T_{m2}$ = 135.8<br>$T_g$ = −72 | 0.4 (1889*) | — |

*Sample thickness in μm for the measurement of moisture uptake

Results

The copolymer from Ex 1 absorbs less water than the copolymer from Comp 1. The hydrolysis resistance will therefore be better. It can also be seen for the copolymer from Ex 1 according to the invention that the use of a blend of a polyether block and a polyester block slightly decreases the density relative to that of the copolymer from Comp 1 which only contains a polyether block. It can also be seen that the melting point of the soft phase ($T_{m1}$) of the copolymer from Ex 1 is lower than that of the copolymer from Comp 1.

Regarding the low temperature stiffening, that is to say the change in the ratio of the modulus when the temperature decreases below 23° C., it can be seen that for the copolymer from Comp 2, based on a pure polyester block, the change is much less significant than for the copolymer from Comp 1, based on a pure PTMG block. Remarkably, an equimolar PTMG/PRIPLAST blend such as the copolymer from Ex 1, also has, relative to the copolymer from Comp 1, a less significant stiffening when the temperature decreases, and this at a constant PA/PE weight ratio.

The invention claimed is:

1. Segmented block copolymer of formula:

-[HB-SB]$_n$-   (I)

in which:
    HB or Hard Block is a polymeric sequence comprising at least one polyamide block (PA block);
    SB or Soft Block is a polymeric sequence comprising at least one polyether block (PE block) and at least one polyester block (PES block); and
    n represents the number of -HB-SB- units of said copolymer, wherein the weight percentage of the PE blocks in the copolymer is greater than 15%, and that said PES blocks have a glass transition temperature $T_g$ below 10° C.

2. Copolymer according to claim 1, wherein the weight percentage of the PA blocks in the copolymer is >20%.

3. Copolymer according to claim 1, wherein the weight percentage of PA blocks is <70%.

4. Copolymer according to claim 1, wherein the PES blocks have a $T_g$ <0° C.

5. Copolymer according to claim 1, wherein the PA blocks have carboxyl end groups.

6. Copolymer according to claim 1, wherein the PA blocks have amine end groups.

7. Copolymer according to claim 1, wherein the PA blocks are made up of:
    (i) a homopolyamide structure derived from the polymerization of (a) a lactam, (b) an amino acid or (c) a dicarboxylic acid/diamine pair; or
    (ii) a copolyamide structure derived from the polymerization of a mixture of at least two from among (a), (b) and (c).

8. Copolymer according to claim 7, wherein the diamine of the (dicarboxylic acid/diamine) pair is chosen from $C_2$ to $C_{40}$ diamines.

9. Copolymer according to claim 8, wherein the diamine is chosen from:
    linear or branched aliphatic diamines; and
    aromatic or non-aromatic cyclic diamines.

10. Copolymer according to claim 9, wherein the diamine is selected from the group consisting of 1,4-tetramethylenediaraine, 1,6-examethylenediamine, 1,9-nonamethylenediamine, 1,12-dodecarnethylenediamine, trimethylhexamethylenediamine, isomers of bis(3-methyl-4-aminocyclohexyl)methane (BMACM), para-aminodicyclohexylmethane (PACM), isomers of 2,2-bis(3-methyl-4-aminocyclohexyl)propane (BMACP), isomers of bis(4-aminocyclohexyl)methane (BACM), 2,2-bis(3-methyl-4-aminocyclohexyl)propane (BMACP), 2,6-is(aminomethyl)norbornane (BAMN), para-arninodicyclohexylmethane (PACM), isophoronediamine (IPDA), m-xylenediamine (MXD) and piperazine (Pip).

11. Copolymer according to claim 7, wherein the dicarboxylic acid of the (dicarboxylic acid/diamine) pair is chosen from $C_6$ to $C_{18}$, dicarboxylic acids.

12. Copolymer according to claim 11, wherein the dicarboxylic acid is selected from the group consisting of
    aliphatic dicarboxylic acids, 1,10-deeanedicarboxylic acid, 1,12-dodecane-dicarboxylic acid, 1,14-tetradecanedicarboxylic acid, or 1,18-octadecanedicarboxylic acid;
    aromatic dicarboxylic acids, isophthalic acid, terephthalic acid; and
    dimers of fatty acids (i) derived from the climerization of two fatty acids, whether identical or different, chosen from oleic acid, linoleic acid, linolenic acid, palmitoleic acid and elaidic acid or (ii) obtained by hydrolysis of vegetable oils or fats.

13. Copolymer according to claim 7, wherein the lactam is chosen from $C_4$ to $C_{12}$ lactams.

14. Copolymer according to claim 13, wherein the lactam is chosen from caprolactam, oenantholactam and lauryl lactam.

15. Copolymer according to claim 7, wherein the amino acid is chosen from $C_4$ to $C_{12}$ amino acids.

16. Copolymer according to claim 15, wherein the amino acid is chosen from aminocaproic acid, 7-aminoheptanoic acid, 11-aminoundecanoic acid and 12-aminododecanoic acid.

17. Copolymer according to claim I, wherein the polyamide blocks are chosen from PA-6, PA-11 and PA-12, PA-4,6, PA-4,12, PA-4,14, PA-4,18, PA-6,6, PA-6,10, PA-6,12, PA-6,14, PA-6,18, PA-9,6, PA-9,12, PA-10,10, PA-10,12, PA-10,14, PA-10,18, PA-6/11 and PA-11/12 blocks.

18. Copolymer according to claim 1, wherein the PE block is chosen from polyethylene glycol (PEG), polypropylene glycol (PPG), polytrimethylene glycol (PO3G), polytetramethylene glycol (PTMG), poly(3MeTHF) and block or random copolymers thereof.

19. Copolymer according to claim 1, wherein the PES blocks are derived from the polycondensation between a dicarboxylic acid and a diol.

20. Copolymer according to claim 19, wherein the dicarboxylic acid is a dimerized fatty acid.

21. Copolymer according to claim 1, wherein the number-average molecular weight of the polyamide blocks is between 500 and 10 000 g/mol.

22. Copolymer according to claim 1, wherein the number-average molecular weight of the polyether blocks is between 100 and 5000 g/mol.

23. Copolymer according to claim 1, wherein the number-average molecular weight of the polyester blocks is between 800 and 5000 g/mol.

24. Copolymer according to claim 1, wherein its number-average molecular weight is >6000 g/mol.

* * * * *